(12) United States Patent
Abrahamsson et al.

(10) Patent No.: US 8,880,206 B2
(45) Date of Patent: Nov. 4, 2014

(54) TOUCH-SENSITIVE SENSOR

(75) Inventors: Magnus Abrahamsson, Lund (SE); Gunnar Klinghult, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1151 days.

(21) Appl. No.: 12/722,118

(22) Filed: Mar. 11, 2010

(65) Prior Publication Data

US 2011/0222714 A1 Sep. 15, 2011

(51) Int. Cl.
*G06F 17/00* (2006.01)
*G06F 3/043* (2006.01)
*G01S 11/14* (2006.01)
*G06F 3/0362* (2013.01)

(52) U.S. Cl.
CPC .............. *G01S 11/14* (2013.01); *G06F 3/043* (2013.01); *G06F 3/0362* (2013.01)
USPC .......................................... 700/94

(58) Field of Classification Search
CPC ...... G06F 3/043; G06F 3/0433; G06F 3/0436
USPC ................ 700/94; 381/26, 91, 92, 111, 122; 345/177; 70/94
See application file for complete search history.

(56) References Cited

U.S. PATENT DOCUMENTS

| 4,238,844 | A | 12/1980 | Ueda et al. |
| 6,366,532 | B1 | 4/2002 | Hoepken |
| 8,325,159 | B2 * | 12/2012 | Kent et al. ...................... 345/177 |
| 2002/0171635 | A1 * | 11/2002 | Takahashi et al. ............ 345/177 |

FOREIGN PATENT DOCUMENTS

| CN | 1264044 A | 8/2000 |
| CN | 1942852 A | 4/2007 |
| CN | 101029931 A | 9/2007 |
| WO | 00/38104 A1 | 6/2000 |

OTHER PUBLICATIONS

K. North et al., "Acoustic Pulse Recognition Enters Touch-Screen Market", Information Display, Palisades Institute for Research Services, 22(12), pp. 22-25 (2006).

* cited by examiner

*Primary Examiner* — Andrew C Flanders
(74) *Attorney, Agent, or Firm* — Edwards Wildman Palmer LLP; Peter F. Corless; Steven M. Jensen

(57) ABSTRACT

A touch-sensitive sensor and a method for detecting a position where a user touches a wire or cable are described.

25 Claims, 2 Drawing Sheets

TOUCH-SENSITIVE SENSOR

BACKGROUND OF THE INVENTION

The present invention relates to a method for detecting a position where a user touches a wire, and a touch-sensitive sensor utilizing the above-mentioned method.

The term "wire" as it is used in the present invention may comprise but is not limited to any longitudinal structure, for example a ribbon, a band, a tape, a strap, a fiber, a filament, a thread or any type of electrical or non electrical wire or cable. Furthermore, the wire may be flexible or rigid and may be used stand alone or in bundles or may be attached to any flexible or rigid material or may be formed integrated with any flexible or rigid material, for example a textile material or wearables.

BRIEF SUMMARY OF THE INVENTION

According to an embodiment, a method for detecting a position where a user touches a first wire and a second wire is provided. The first and the second wires are arranged at least partially adjacently, for example at least partially in parallel. The first wire has a first sonic propagation velocity and the second wire has a second sonic propagation velocity which is different from the first sonic propagation velocity. According to the method, a first acoustic sound signal is received at the first wire upon the user touching the first wire. Furthermore, a second acoustic sound signal is received at the second wire upon the user touching the second wire. The position where the user touches both the first wire and the second wire is determined based on the first acoustic sound signal and the second acoustic sound signal.

The wires may be arranged in a cable connecting a mobile device, for example a mobile phone or a mobile music player, to an accessory, for example a head phone, a charger or a microphone. Thus, the cable to the accessory may be used as an input device for the user of the mobile device. The user can control the accessory or the mobile device by tapping or squeezing on different locations on the cable.

The first acoustic sound signal may be received at a predetermined position of the first wire, and the second acoustic sound signal may be received at a predetermined position of the second wire. The predetermined position of the first and the second wire may be at the ends of the wires ending at the mobile device.

The position where the user touches the wires may be determined by determining a time difference between receiving the first acoustic sound signal and the second acoustic sound signal. Furthermore, the position where the user touches the wire may be determined by determining a phase difference between the first acoustic sound signal and the second acoustic sound signal. Moreover, any other method of correlating the first acoustic sound signal and the second acoustic sound signal may be used to determine the position that the user touches the wires.

According to an embodiment, at least one of the first and second wires is made of plastic. Furthermore, at least one of the first and the second wires may be made of a metal. Preferably, the first wire is made of plastic and the second wire is made of steel. Moreover, the first and the second wires may be comprise a core conductor, a shield conductor or an insulation layer of a coaxial cable. Thus, an appropriate difference between the first sonic propagation velocity and the second sonic propagation velocity may be achieved.

According to another embodiment, a further method for detecting a position where a user touches a wire is provided. According to the method, upon the user touching the wire, a first acoustic sound signal at a first predetermined position of the wire is received, and a second acoustic sound signal at a second predetermined position of the wire is received. The position where the user touches the wire is determined based on the first acoustic sound signal and the second acoustic sound signal.

The position where the user touches the wire may be determined by determining a time difference between receiving the first acoustic sound signal and the second acoustic sound signal, by determining a phase difference between the first acoustic sound signal and the second acoustic sound signal, or by correlating the first acoustic sound signal and the second acoustic sound signal. The first acoustic sound signal and the second acoustic sound signal may be received at the ends of the wire and the wire may be integrated into a cable connecting a mobile device to an accessory.

The wire may be made of plastic or metal. Furthermore, the wire may comprise a fiber, for example a glass fiber or a carbon fiber.

According to another embodiment, a touch-sensitive sensor is provided. The touch-sensitive sensor comprises a first wire having a first sonic propagation velocity and a second wire having a second sonic propagation velocity which is different from the first sonic propagation velocity. The first wire and the second wire are arranged at least partially adjacently. The first wire and the second wire may be arranged for example in parallel in an accessory cable for connecting a mobile device to an accessory device. The mobile device may comprise a mobile phone, a personal digital assistant, a mobile navigation system, a mobile media player or a mobile computer. The accessory may comprise a microphone, a headphone or a charger. A first acoustic sensor of the touch-sensitive sensor is coupled to the first wire and adapted to receive a first acoustic sound signal from the first wire upon a user touching the first wire. A second acoustic sensor of the touch-sensitive sensor is coupled to the second wire and adapted to receive a second acoustic sound signal from the second wire upon the user touching the second wire. A processing unit of the touch-sensitive sensor is coupled to the first acoustic sensor and the second acoustic sensor. The processing unit is adapted to determine a position where the user touches both, the first wire and the second wire, from the first acoustic sound signal and the second acoustic sound signal.

Thus, when the user is tapping or squeezing the first and the second wire, acoustic waves are propagated inside the first wire and the second wire from the position where the user taps or squeezes the wires to the sensors coupled to the wires. Due to the different sonic propagation velocities of the first and the second wires, the processing unit may be enabled to determine the position where the user taps or squeezes the wire.

According to an embodiment, at least one of the first and the second acoustic sensors comprises a piezo-electric sensor. The piezo-electric sensor may comprise a piezo-electric ceramic or a piezo-electric plastic.

According to an embodiment, at least one protrusion is arranged on at least one of the first and the second wires. The protrusion may indicate a touching position on the wire to the user and may be related to a specific function. Furthermore, the protrusion may utilize the generation of the acoustic sound signal when the user is touching the protrusion or sliding along the protrusion.

According to another embodiment, a touch-sensitive sensor is provided which comprises a wire, a first acoustic sensor coupled to a first predetermined position of the wire, and a second acoustic sensor coupled to a second predetermined position of the wire. The first acoustic sensor is adapted to receive a first acoustic sound signal from the wire upon a user touching the wire, and the second acoustic sensor is adapted to receive a second acoustic sound signal from the wire upon the user touching the wire. The touch-sensitive sensor comprises furthermore a processing unit coupled to the first acoustic sensor and the second acoustic sensor. The processing unit is adapted to determine a position where the user touches the wire from the first and the second acoustic sound signals.

The wire may be arranged in an accessory cable for connecting a mobile device, for example a mobile phone, a personal digital assistant, a mobile navigation system, a mobile media player or a mobile computer, to an accessory, for example a microphone, a headphone or a charger. According to an embodiment, at least one protrusion may be arranged on the wire. Furthermore, the first and second predetermined positions may comprise a first end and a second end, respectively, of the wire.

Although specific features described in the above summary and the following detailed description are described in connection with specific embodiments, it is to be understood that the features of the embodiments described can be combined with each other unless it is noted otherwise.

BRIEF DESCRIPTION OF THE DRAWINGS

Hereinafter, exemplary embodiments of the invention will be described with reference to the drawings.

DETAILED DESCRIPTION OF THE INVENTION

In the following, exemplary embodiments of the invention will be described in detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It is to be understood that the features of the various exemplary embodiments described herein may be combined with each other unless specifically noted otherwise.

Figure 1:
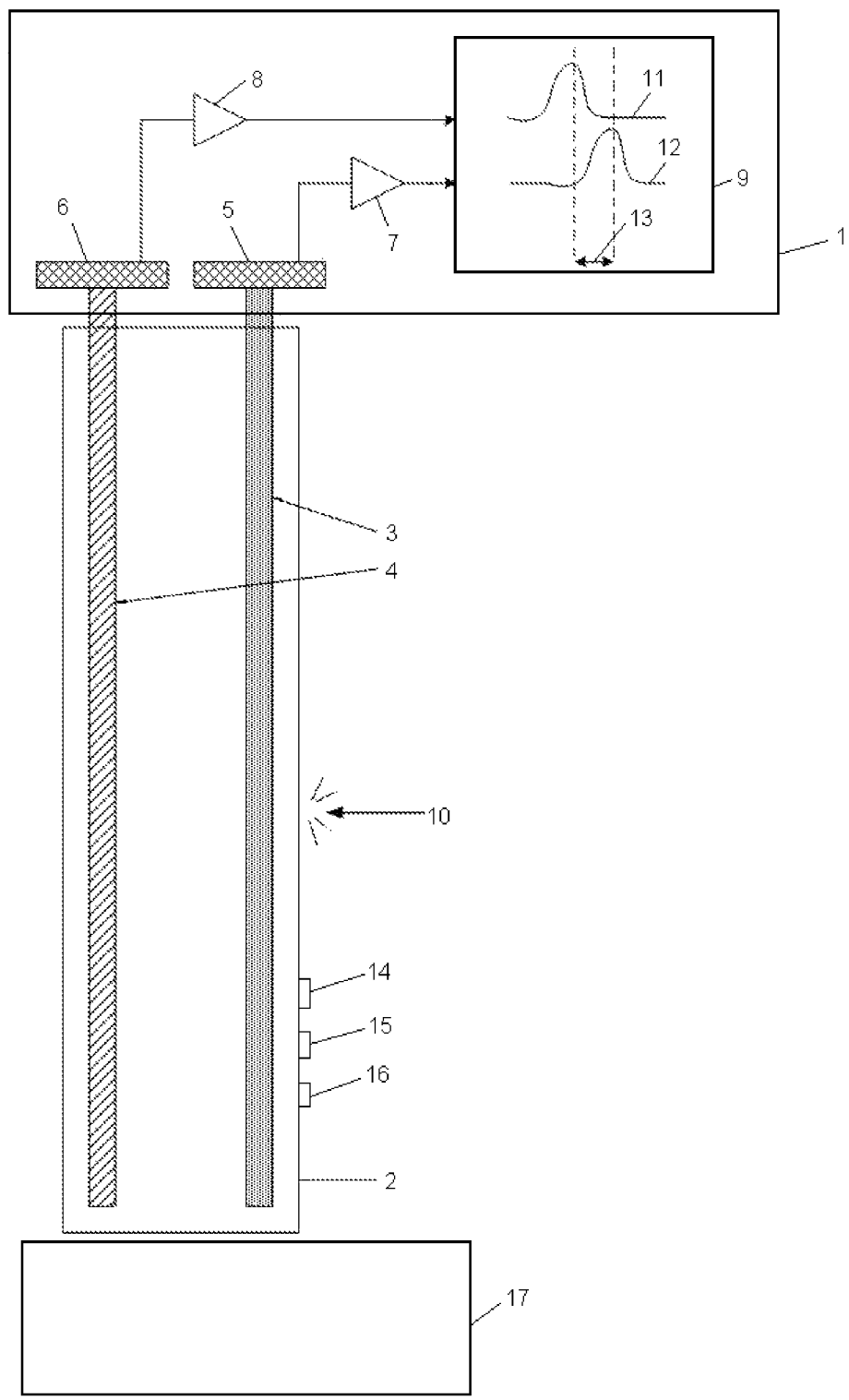
FIG. 1 schematically shows a touch-sensitive sensor according to an embodiment of the present invention.

FIG. 1 shows schematically an accessory 1 which is connected via a cable 2 to a mobile device 17. Inside of the cable 2, a first wire 3 and a second wire 4 are provided in parallel along the length of the cable 2. Cable 2 may provide further wires which are not shown in the figure, for example wires for electrically connecting components of the accessory 1 to the mobile device 17. However, these additional wires are not shown in FIG. 1 to simplify matters. The mobile device 17 may be a mobile phone, a personal digital assistant, a mobile navigation system, a mobile media player or a mobile computer. The accessory 1 may be a headphone, a microphone, a combination of a headphone and a microphone or a charger for the mobile device. The additional wires (not shown) in the cable 2 may be provided to connect for example a microphone or loudspeakers of the accessory 1 to the mobile device 17.

In the accessory 1, a first acoustic sensor 5 is connected to the first wire 3 and a second acoustic sensor 6 is connected to the second wire 4. The acoustic sensors 5, 6 may be piezoelectric sensors comprising a piezo-electric ceramic or a piezo-electric plastic. The first wire 3 and the second wire 4 have different sonic propagation velocities, i.e. different sound speeds. One of the first and the second wires 3, 4 may be made of plastic, whereas the other of the first and the second wire 3, 4 may be made of metal. This may provide a large difference between the first and second sonic propagation velocities resulting in a large time shift as will be explained below. However, the first and the second wires 3, 4 may be made of any other materials providing different sound speeds. The first sensor 5 is adapted to pick up sound waves propagated inside the first wire 3. Similarly, the second sensor 6 is adapted to pick up sound waves propagated in the second wire 4. The sensors 5, 6 are furthermore adapted to convert the received sound waves into electrical signals which are provided to corresponding amplifiers 7 and 8 provided in the accessory 1. The amplified signals from the amplifiers 7, 8 are provided to a processing unit 9 of the accessory 1. The processing unit 9 is adapted to receive the converted and amplified sound signals from the sensors 5, 6 and amplifiers 7, 8, and to correlate the resulting signals, for example by determining a phase shift between the signals.

When a user is tapping or squeezing the cable 2 at any position along the length of the cable 2, for example at position 10, a first sound wave is caused in the first wire 3 and a second sound wave is caused at the same time in the second wire 4. Due to the different sonic propagation velocities of the first and the second wires, the first and the second sound waves arrive at different times at the sensors 5, 6. Assuming that the first sonic propagation velocity of the first wire 3 is slower than the second sonic propagation velocity of the second wire 4, the first sound wave of the touching at position 10 arrives earlier at the sensor 6 than the second sound wave at the second sensor 5. Thus, the processing unit 9 receives a first electrical signal 11 representing the first sound wave and a second electrical signal 12 representing the second sound wave. The first electrical signal has approximately the same shape as the second electrical signal 12, but there is a time shift 13 between the first electrical signal 11 and the second electrical signal 12. Depending on the position 10 where the user squeezes or taps the cable 2, the time shift 13 is larger or smaller. When the user touches the cable 2 near the sensors 5, 6, the time shift 13 is small whereas when the user touches the cable 2 at the opposite end near the mobile device 17, the time shift 13 becomes large.

Thus, the wires 3, 4, the sensors 5, 6 and the processing unit 9 build up a touch-sensitive sensor adapted to distinguish several touching positions on the cable 2. Each touching position may be assigned a specific function of the accessory 1 which is activated by the processing unit 9 upon detection of a touch at one of the touching positions. The touching positions may be marked optically at the cable 2, for example by colored sections of the cable 2 or by imprints on the cable 2, or by tactile marks on the cable 2, for example protrusions 14-16. The protrusions 14-16 may be domes or something similar on specific positions of the cable 2. The protrusions 14-16 may additionally provide the possibility to generate an impulse sound wave. This will give both tactile feedback for the user and a very clear transient sound generation to the sensors 5, 6. Furthermore, not only a tapping at a position may be detected by the sensors 5, 6 but also a sliding of a finger of the user along the cable 2 may be detected by the sensors 5, 6. Thus, for example by sliding in a first direction along the cable 2, a volume of music reproduced by of the mobile device 17 may be increased and sliding in the opposite direction along the cable 2 may decrease the volume.

Although in the above described embodiment the sensors 5, 6, the amplifiers 7, 8, and the processing unit 9 are located in the accessory 1, in other embodiments these components may be located at least partially also in the mobile device 17.

Furthermore, functions of the mobile device 17 may be activated by tapping or squeezing the cable 2.

Figure 2:
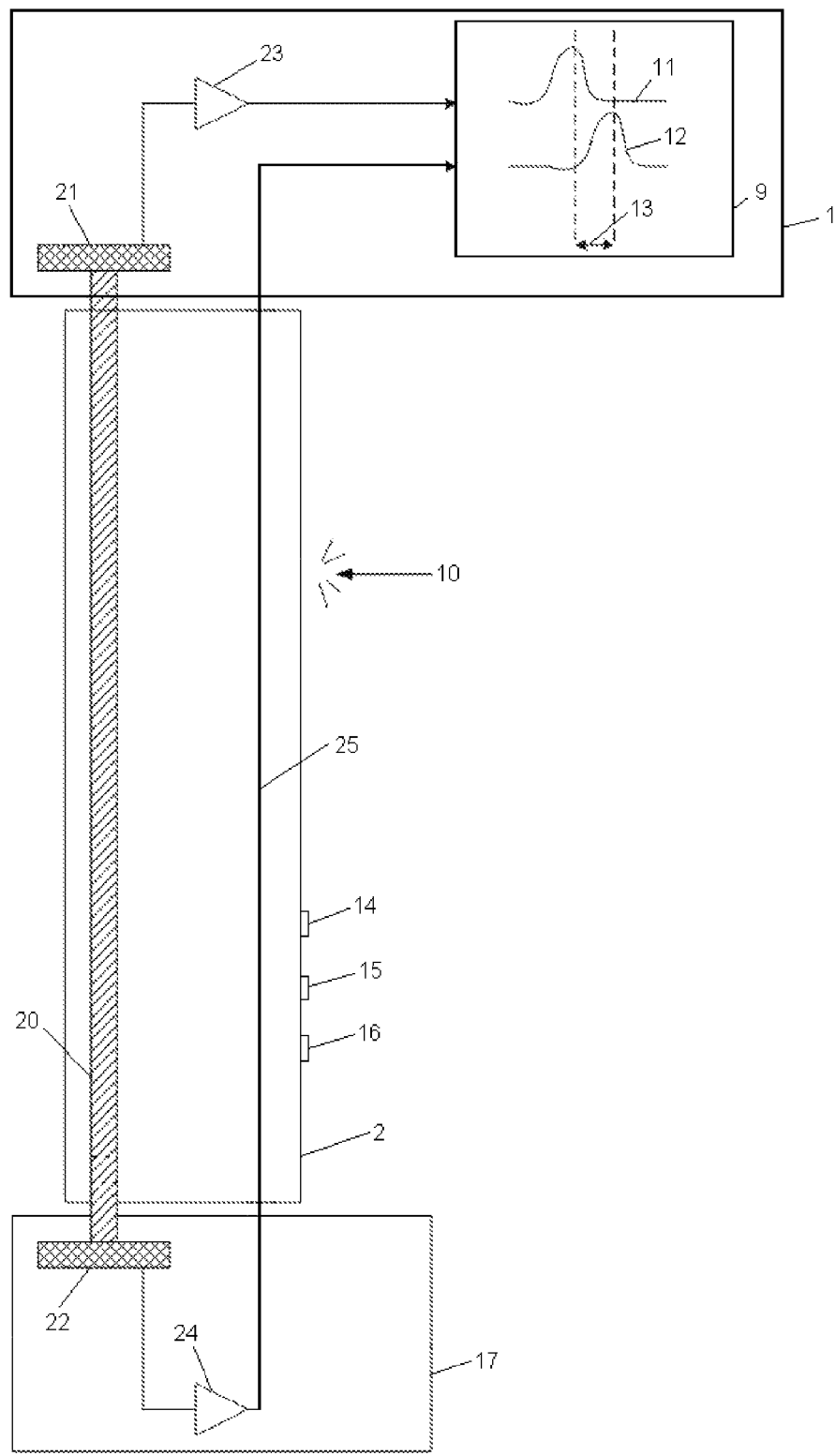
FIG. 2 schematically shows another embodiment of a touch-sensitive sensor according to the present invention.

FIG. 2 shows another embodiment of a touch-sensitive sensor. A mobile device 17, for example a mobile phone, is connected to an accessory 1, for example a microphone or a headset, via a cable 2. The touch-sensitive sensor comprises a wire 20 which is arranged in the longitudinal direction of the cable 2, a first acoustic sensor 21 coupled to a first end of the wire 20 and arranged in the accessory 1, a second acoustic sensor 22 coupled to a second end of the wire 20 and arranged in the mobile device 17, a first amplifier 23, a second amplifier 24, and a processing unit 9. The first amplifier 23 is located in the accessory 1 and amplifies the electrical signal from the first acoustic sensor 21 and passes the amplified signal to the processing unit 9. The second amplifier 24 is located in the mobile device 17 and amplifies the electrical signal from the second acoustic sensor 22 and passes the amplified signal via a connection 25 through the cable 2 to the processing unit 9 in the accessory 1. Besides the wire 20 and the connection 25 there may be some more connections or wires inside the cable 2 for connecting components (not shown) of the mobile device 17 to components (not shown) of the accessory 1 but these additional connections, wires and components are not shown in FIG. 2 to simplify matters.

When a user touches, taps or pinches the cable 2 at any position, e.g. at a touching position 10, an acoustic wave is generated in the wire 20 and propagated by the wire 20 to both ends of the wire 20 where the sensors 21 and 22 are located. The sensors 21 and 22 are adapted to detect the propagated acoustic waves. The sensors 21 and 22 may be piezo-electric sensors comprising for example a piezo-electric ceramic or a piezo-electric plastic. The sensors 21, 22 are furthermore adapted to convert the received acoustic wave into a corresponding electrical signal. The corresponding electrical signals are forwarded to the amplifiers 23, 24 and amplified by the amplifiers 23, 24. The amplified signals are directed to the processing unit 9. The processing unit 9 is adapted to receive and correlate the signals from the amplifiers 23, 24. For example, the processing unit 9 may be adapted to determine a phase shift between a signal 11 received from amplifier 23 and a signal 12 received from amplifier 24. The time shift 13 depends on the touching position 10 where the user touches the cable 2. When the user touches the cable 2 near the first acoustic sensor 21, the electrical signal 11 representing the sound wave received at sensor 21 is determined earlier in time than the electrical signal 12 representing the sound wave received by the second acoustic sensor 22. Thus, from the resulting time shift 13 the touching position 10 can be determined. As described in connection with FIG. 1, the processing unit 9 may assign different functions of the accessory 1 to different touching positions 10. Furthermore, as already described in connection with FIG. 1, protrusions 14-16 may be provided at the cable 2 to generate the sound waves and to give the user a tactile feedback when touching the cable 2.

While exemplary embodiments have been described above, various modifications may be implemented in other embodiments. For example, the wires 3, 4 and 20 may be not only used for propagating acoustic waves, but may also be used additionally to transmit electrical signals from the accessory 1 to the mobile device 17 and vice versa, for example electrical signals representing music to be played back by loudspeakers of the accessory 1 or electrical signals representing speech received by a microphone of the accessory 1. Furthermore, the sensors 5, 6 and 21 may be located in a connector for connecting the cable 2 to the accessory 1 or the mobile device 17 in case the cable 2 is detachable from the accessory 1 or the mobile device 17, respectively.

Finally, it is to be understood that all the embodiments described above are considered to be comprised by the present invention as it is defined by the appended claims.

What is claimed is:

1. A method for detecting a position where a user touches a first and a second wire, the first and the second wires being arranged at least partially adjacently, the first wire having a first sonic propagation velocity and the second wire having a second sonic propagation velocity different from the first sonic propagation velocity, wherein the method comprises:
   receiving a first acoustic sound signal at the first wire, the first acoustic sound signal being generated by the user touching the first wire,
   receiving a second acoustic sound signal at the second wire, the second acoustic sound signal being generated by the user touching the second wire,
   determining the positions where the user touches the first and second wires based on the first acoustic sound signal and the second acoustic sound signal, respectively.

2. The method according to claim 1, wherein
   the first acoustic sound signal is received at an end of the first wire, and
   the second acoustic sound signal is received at an end of the second wire.

3. The method according to claim 1, wherein determining the positions where the user touches the wires comprises determining a time difference between receiving the first acoustic sound signal and the second acoustic sound signal.

4. The method according to claim 1, wherein determining the positions where the user touches the wires comprises determining a phase difference between the first acoustic sound signal and the second acoustic sound signal.

5. The method according to claim 1, wherein determining the positions where the user touches the wires comprises correlating the first acoustic sound signal and the second acoustic sound signal.

6. The method according to claim 1, wherein at least one of the first and second wires is made of plastic.

7. The method according to claim 1, wherein at least one of the first and second wires is made of metal.

8. The method according to claim 1, wherein the first wire is made of plastic and the second wire is made of metal.

9. A method for detecting a position where a user touches a wire, wherein the method comprises:
   receiving a first acoustic sound signal at a first predetermined position of the wire, the first acoustic sound signal being generated by the user touching the wire,
   receiving a second acoustic sound signal at a second predetermined position of the wire, the second acoustic sound signal being generated by the user touching the wire,
   determining the first and second predetermined positions where the user touches the wire based on the first acoustic sound signal and the second acoustic sound signal, respectively.

10. The method according to claim 9, wherein determining the positions where the user touches the wire comprises determining a time difference between receiving the first acoustic sound signal and the second acoustic sound signal.

11. The method according to claim 9, wherein determining the positions where the user touches the wire comprises determining a phase difference between the first acoustic sound signal and the second acoustic sound signal.

12. The method according to claim 9, wherein determining the positions where the user touches the wire comprises correlating the first acoustic sound signal and the second acoustic sound signal.

13. The method according to claim 9, wherein the wire is made of plastic.

14. The method according to claim 9, wherein the wire is made of metal.

15. A touch-sensitive sensor, comprising:
- a first wire having a first sonic propagation velocity,
- a second wire having a second sonic propagation velocity different from the first sonic propagation velocity, wherein the first wire and the second wire are arranged at least partially adjacently,
- a first acoustic sensor coupled to the first wire and adapted to receive a first acoustic sound signal from the first wire, wherein the first acoustic sound signal is generated by a user touching the first wire,
- a second acoustic sensor coupled to the second wire and adapted to receive a second acoustic sound signal from the second wire, wherein the second acoustic sound signal is generated by the user touching the second wire, and
- a processing unit coupled to the first acoustic sensor and the second acoustic sensor and adapted to determine positions where the user touches both the first wire and the second wire from the first and second acoustic sound signals, respectively.

16. The touch-sensitive sensor according to claim 15, wherein at least one of the first and second acoustic sensors comprises a piezoelectric sensor.

17. The touch-sensitive sensor according to claim 16, wherein the piezoelectric receiver comprises at least one of a piezoelectric ceramic or a piezoelectric plastic.

18. The touch-sensitive sensor according to claim 15, wherein the wires are arranged in parallel in an accessory cable for connecting a mobile device to an accessory.

19. The touch-sensitive sensor according to claim 18, wherein the accessory comprises at least one of a microphone, a headphone or a charger.

20. The touch-sensitive sensor according to claim 18, wherein the mobile device comprises a device selected from the group consisting of a mobile phone, a personal digital assistant, a mobile navigation system, a mobile media player, and a mobile computer.

21. The touch-sensitive sensor according to claim 18, wherein at least one protrusion is arranged on at least one of the first and second wires.

22. A touch-sensitive sensor comprising:
- a wire,
- a first acoustic sensor coupled to a first predetermined position of the wire and adapted to receive a first acoustic sound signal from the wire, wherein the first acoustic sound signal is generated by a user touching the wire,
- a second acoustic sensor coupled to a second predetermined position of the wire and adapted to receive a second acoustic sound signal from the wire, wherein the second acoustic sound signal is generated by the user touching the wire, and
- a processing unit coupled to the first acoustic sensor and the second acoustic sensor and adapted to determine positions where the user touches the wire from the first and second acoustic sound signals, respectively.

23. The touch-sensitive sensor according to claim 22, wherein the wire is arranged in an accessory cable for connecting a mobile device to an accessory.

24. The touch-sensitive sensor according to claim 23, wherein the accessory comprises at least one of a microphone, a headphone or a charger.

25. The touch-sensitive sensor according to claim 23, wherein the mobile device comprises a device selected from the group consisting of a mobile phone, a personal digital assistant, a mobile navigation system, a mobile media player, and a mobile computer.

* * * * *